United States Patent Office 3,224,964
Patented Dec. 21, 1965

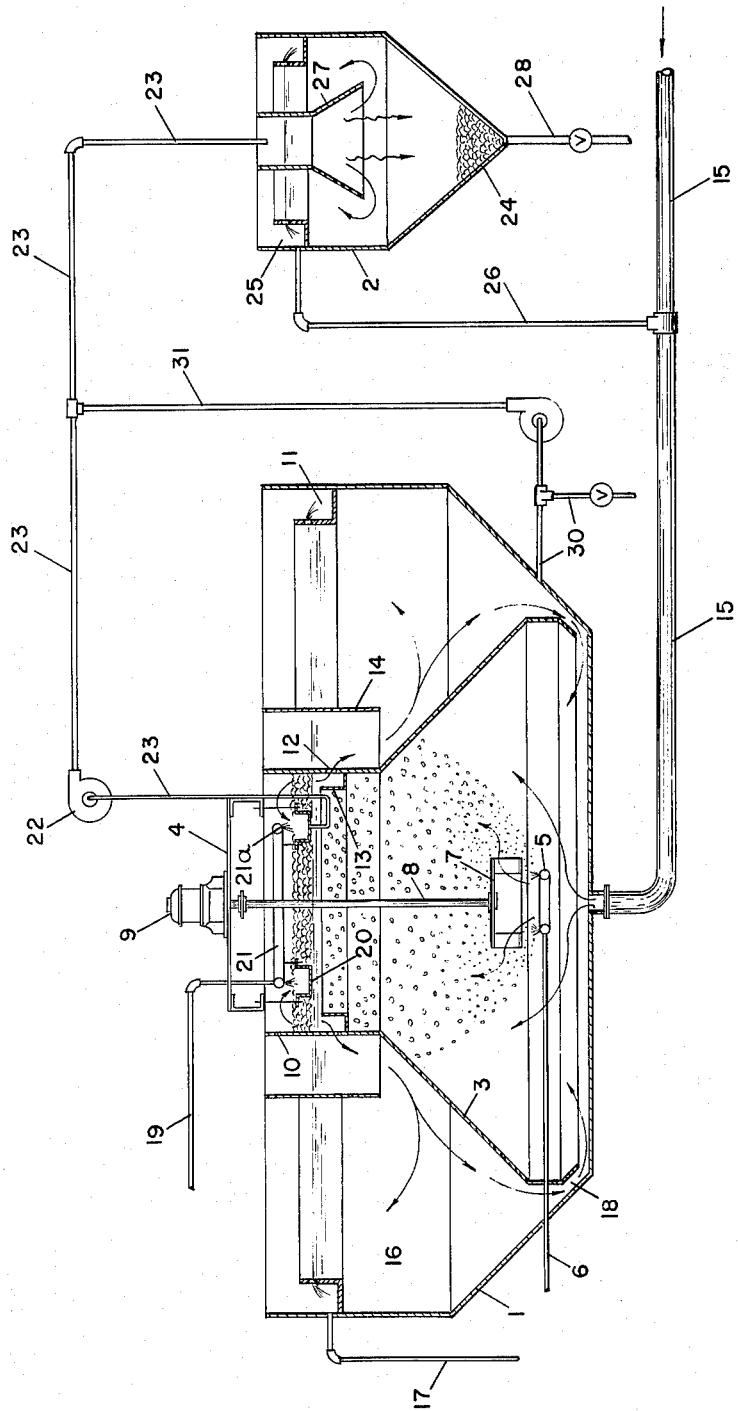

3,224,964
APPARATUS AND PROCESS FOR BIOLOGICAL PURIFICATION OF WASTE WATER CONTAINING FOAM FORMING SUBSTANCES
Günther Derenk, Buchschlag, near Frankfurt am Main, Christian Otto Schmid, Frankfurt am Main, and Heinrich Sontheimer, Falkenstein, Taunus, Germany, assignors, by mesne assignments, to Fuller Company, Catasauqua, Pa., a corporation of Delaware
Filed Apr. 3, 1961, Ser. No. 100,365
9 Claims. (Cl. 210—8)

This invention relates to an apparatus and a process for treating waste waters containing foam forming substances by means of aeration, with or without the presence of biologically active sludge, and particularly to means and method of reducing the foam and the foam forming substances in the waste water under treatment and disposing of them in a simple manner and in a form which permits their further treatment and disposal together with other waste products of the treatment process.

It is an object of this invention to provide means for collecting foam forming on an aeration zone, and means for destroying the collected foam and diluting it sufficiently so it will flow to a point of disposal.

Another object of the invention is to provide means for promoting foam formation in an aeration basin, and for withdrawing the foam continuously, as it is formed, thereby reducing the quantity of foam and of foam forming substances in the liquid undergoing aeration.

Another object is to provide a process for treating waste waters containing foam forming substances, such as detergents or other surface active agents, by aeration, wherein the foam overlying the aeration zone is collected, diluted and removed from the aeration zone.

Another object is to provide a process of this general type, wherein the concentration of foam forming substances in the liquid under treatment is materially reduced by encouraging foam formation and withdrawing the foam formed from the process.

These and other objects will become apparent by consideration of the detailed description and the claims which follow.

Foam formation poses a difficult problem in many chemical and biological treatment processes. For example, in the purification of wastes containing organic substances, particularly of municipal wastes, by aeration alone or according to the activated sludge process by aeration and treatment with a biologically active sludge, the difficulties caused through detergents become a serious matter.

Whereas the soaps, which are alkali salts of fatty acids, precipitate in the water purification processes as slightly soluble calcium salts and can also be acted on biologically, the detergents, being sulfonates or sulfuric acid esters of aliphatic and aromatic hydrocarbons, do not form slightly soluble salts and are difficult to act upon by biological decomposition by means of activated sludge. In the aeration basins they cause considerable trouble due to foam formation.

It is known to suppress foam formation in chemical processes by spraying the foam layer with liquid available in the process. Also, anti-foam compounds are used to suppress foam formation.

By these and similar methods the foam formation in the treatment basin can be substantially or completely suppressed, but the foam appears again at overflows, weirs and the like which follow the treating basin, since the foam forming substances have been retained in the liquid. Furthermore, large quantities of liquid must be sprayed continuously to prevent foam formation. Attempts to skim the foam off the treating basins and treat it separately, have been unsuccessful to date, partly due to structural difficulties and partly due to the lack of a suitable treatment process for the liquid formed by the foam.

The invention relates to a process for treating waste waters containing detergents or other foam forming materials by means of aeration and, if required, in the presence of biologically active sludge. The process according to the invention is characterized by collecting the foam formed on the surface of the aeration zone, destroying it by spraying it with water, and withdrawing the diluted liquid formed of the foam in this manner from the process and separating the solids, if present, preferably by sedimentation, from the withdrawn liquid.

In accordance with the invention foam collecting launders are provided above the water surface in the aeration chamber, whereinto the foam flows, to be destroyed therein by spraying of water. The overflow edges of the launders are about 30–70 cm. (centimeter) above the liquid surface. For spraying of the foam in the launders the effluent of the biological purification plant is used ordinarily, however, fresh water or raw waste water can also be used. In spraying the foam, sufficient liquid is added to make it possible to withdraw the foam and to separate any solids contained in the liquid thus formed largely by sedimentation, and to withdraw the separated solids as thickened sludge from the process. Due to the continuous destruction of the foam in the launders, newly forming foam can immediately flow into the launders, so that all the foam formed is withdrawn from the surface of the aeration chamber.

Due to the dilution effected simultaneously with the destruction of the foam, the solids which may be present and which are hard to separate without such a dilution, can be settled in a subsequent sedimentation basin and be separated from the overlying relatively clear water. The separated solids may contain about 90% of the foam forming substances withdrawn with the foam, e.g., the detergents. The clarified supernatant may be returned to the aeration basin without detrimental effect in many cases. The settled solids can be further treated either separately or together with other sludges from the waste purification plant.

The quantity of the dilution water should be generally at least twice the quantity of water originating from the foam. In each individual case where solids are present, it should be determined experimentally whether a better separation of the solids results from further dilution.

Contrary to the known processes, which aim at a suppression of foam formation, in the process according to the invention the foam formation is promoted by distributing the air over a large cross-sectional area near the basin bottom from which it rises in bubble form, and compressing it near the liquid surface into an area constituting a relatively small portion of the cross-section of the aeration zone. This can be effected for example by forming the aeration zone in vertical section as a trapezium. The large cross-sectional area of the aeration zone over the large basis is then opposed by the substantially smaller liquid surface at the short parallel side. The compressed air emerging there produces a thick layer of foam which, according to the invention, is allowed to grow to a height of 30–70 cm. above the liquid surface. At a suitable elevation above the liquid surface launders are arranged, as described, the foam flowing down over their edges and being destroyed in the launders by spraying of liquid onto it. The resulting liquid is passed to a suitable place of disposal. When the liquid contains a considerable amount of solids it is preferably passed to a thickener where the solids are concentrated by sedimentation and withdrawn as sludge, while the effluent from the thickener is returned to the raw water.

Contrary to the suppression of foam formation, where the detergents remain in the liquid under treatment, in the process according to the invention up to 60% of the surface active agents contained in the raw waste are separated from the liquid under treatment with the foam and are eliminated from the waste purification process with the liquid withdrawn. Any solids contained in this liquid are discharged from the thickener in a form which permits further treatment according to known methods.

The invention thus eliminates the causes of foam formation by reducing the concentration of foam forming substances in the waste water, whereas in the known processes the suppression of foam formation may not appreciably reduce the content of surface active agents of the treated water as compared with the untreated water.

Providing a relatively small surface in the aeration basin eliminates the need for complicated foam collection systems which would be required if the foam would be allowed to spread over a large area. Due to its concentration in a small area, the foam builds up to a considerable height and readily flows into the collecting launders.

The invention is not limited to application to activated sludge plants, but can also be used for mere aeration plants, for example as pretreatment for an activated sludge process. Such aeration plants are operated, in accordance with the invention, to obtain strong foam formation in the manner described above, whereby a considerable portion of the detergents or other foam producing substances is eliminated from the raw waste.

The separation of solids from the suspension withdrawn from the launder can be improved in known manner by flocculants and flocculation aids. This treatment may be followed by a secondary chemical flocculation with addition of activated sludge from the aeration plant. Flocculation and/or secondary flocculation are advantageously carried out according to the known slurry recirculation process. Since the flocs formed in these processes bind additional foam forming substances, the detergents contained in the foam are incorporated almost completely into the sludge.

The drawing shows a plant according to the invention as applied to a solids containing foam, such as is formed frequently by municipal sewage containing appreciable quantities of detergents. The plant comprises an aeration basin 1 which is partitioned into an aeration zone or chamber proper and a surrounding separation and clarification zone or chamber, and a thickener 2. The aeration basin can be operated as an activated sludge plant or as aeration and separation basin.

The basin 1 is preferably round and is provided with a concentric upwardly tapering frusto-conical partition 3. In the lower, large diameter portion of the aeration chamber within the partition 3 an air distributor 5, for example a sparger ring with orifices, is arranged and is connected to an air line 6. Only slightly above the sparger ring a rotor 7 is axially mounted and is driven through a shaft 8 by a motor 9. The motor 9 may be supported by a bridge 4, as shown, or in any other suitable manner. The waste water is introduced into the aeration chamber below the air distributor 5, through a raw waste inlet line 15. The rotor 7 sucks in finely divided air and liquid axially and discharges the mixture radially, whereby the air is efficiently dispersed laterally through the liquid. The frusto-conical partition 3 merges at its upper end into a cylindrical extension 10, which extends beyond the liquid level established by an effluent launder 11 which is arranged at the upper edge of the basin wall. Below the liquid level the partition 10 is provided with ports 12 which may be protected by a channel 13, to prevent air from the aeration zone within partitions 3 and 10 from entering the clarification and separation zone. The liquid passing through ports 12 from the aeration zone is deflected downwardly along the outer wall of partition 3 by a concentric partition 14 which extends from above the liquid level to an elevation below the ports 12. An amount of clarified waste water, equal to the quantity of raw waste water introduced through line 15, separates from the downflow and flows upwardly into the clarification zone 16 and thence through effluent launder 11 into effluent conduit 17. A portion of the downflow is withdrawn intermittently or continuously through a valved excess solids conduit 30 to a point of disposal or further treatment, to maintain the solids concentration in tank 1 substantially constant. The remaining portion of the downflow returns through passages 18 between the partition 3 and the basin floor to the aeration zone within partition 3.

One or more foam collection channels or launders 20 are supported at a suitable elevation above the liquid level in the aeration chamber by the bridge 4 or by any other suitable means. The air rising in the aeration zone to and through the liquid surface, which is restricted by the cylindrical partition 10, builds up above the liquid surface a foam layer which, in the course of operation, surpasses the walls of launders 20. If the foam formation is variable and at times very strong, it is advantageous to make the elevation of the overflow edges of the launders 20 adjustable relative to the liquid surface. The foam falling into the launders 20 is destroyed by spraying water on it from a sparger ring 21, provided with nozzles 21a. The sparger ring 21 may be supported in any suitable manner, such as from the launders 20, as shown. Treated water from conduit 17 can be used for spraying, or a fresh water line 19 can be connected to the sparger ring 21. The liquid formed by the foam and sprayed water is conveyed by a pump 22 or by gravity through a conduit 23 to the thickener 2.

The excess solids withdrawn from tank 1 through conduit 30 can also be introduced into the thickener 2 and may be concentrated therein together with the solids separating from the foam liquid. They can be introduced either directly, or, as shown, by connecting conduit 30 to conduit 23 through a conduit 31. Lifting of the excess solids may be by air lift or by a pump, as shown. If the thickener 2 is installed at a lower elevation than the basin 1, flow through conduits 23 and 30–31 may be by gravity.

The thickener 2 may be of any suitable shape, but is shown for purposes of exemplification as a cylindrical container with a hopper bottom 24. At the inner upper edge of the container a clear water collecting channel 25 is mounted, from which leads a conduit 26 for the overflow water. A frusto-conical, downwardly enlarged partition 27 extends concentrically in the container from the elevation of the container top edge down into the liquid. Into the space surrounded by this partition the conduit 23 discharges the liquid formed in launders 20 by the destruction of the foam and may also discharge excess solids withdrawn from basin 10 through conduit 30, if conduit 30 is connected by conduit 31 to conduit 23. Any solids contained in this liquid sink to the bottom and are withdrawn as thickened sludge through sludge outlet conduit 28 to disposal. The liquid overflowing into channel 25 may be returned through conduit 26 to the raw waste inlet line 15 of the aeration basin. One or more flocculation basins may precede the thickener.

Instead of a round basin a longitudinal basin can be used as aeration or activated sludge plant, respectively. In this case the drawing illustrates the basin 1 in a vertical section parallel to an end wall of the basin. The partitions in this case are walls parallel to the side walls of the basin. The effluent launders 11 are mounted on the side walls. The foam collecting launders 20 can be arranged parallel to the side or end walls. Along the length of the basin a plurality of sparger rings and rotors, such as shown at 5 and 7, are arranged. The process according to the invention is not limited to the form of basin described, but can be practiced with an aeration basin of any desired form.

Example

In an activated sludge plant operated according to the slurry recirculation process a mechanically clarified waste water with an average 5 day BOD (Biological Oxygen Demand) of 250 p.p.m. (parts per million) and an average detergent content of 15 mg./l. (milligram/liter) was treated. Operation was at times seriously disturbed by a strong foam formation. Therefore the surface of the aeration zone, which has a diameter of 6 m. (meter), while the lower part of the aeration zone has a diameter of 12 m. was sprayed with about 10 m.$^3$/h. (cubic meter/hour) of clarified waste water. In this manner the foam formation could just be reduced to a bearable degree. However, the energy required for the spraying was considerable.

Based on liquid, the foam had an average solids content of 7 g./l. (gram/liter). 3.5% of the solids separated from the foam liquid were detergents. The solids containing foam water contained a total of 275 mg./l. detergents, of which 245 mg./l. were bound to solids and 30 mg./l. were dissolved. An attempt to withdraw the foam directly failed. The daily foam water formation was 20 m.$^3$, which was almost 1% of the daily raw water throughput. The solids contained in the foam water had a fat content of 40 to 50% which was so foul and sticky as to make a destruction of the large quantity of foam water impossible.

These difficulties were removed in simple manner by using the apparatus and process according to the invention. A 50 cm. wide concentric collecting channel was mounted above the aeration chamber with its upper edge 40 cm. above the liquid surface. The distance between the channel and the outside wall of the aeration zone was 1 m. The foam rising above the elevation of the overflow edge of the channel was flowing into the channel like a liquid. 4–5 m.$^3$/h. of clarified water was sprayed into the channel and the foam thereby destroyed. The liquid flowing from the channel was passed into the thickener and separated therein into sludge with a solids content of 50 g./l. and a relatively clear liquid which was returned to the raw water inlet to the plant. The detergent content of the thickened sludge was about 2350 mg./l. Instead of the 20 m.$^3$ foam water mentioned above, only 2.5 m.$^3$ of sludge with a very high detergent content were produced. The sludge was digested together with the other excess sludges of the purification plant.

By the process of the invention, which removes the detergents from the waste water, the flocculation of the activated sludge and the purification effect of the plane are substantially improved. The solids withdrawn with the foam contain a considerable portion of the fatty substances contained in the raw water. When practicing the process according to the invention the ether solubles in the activated sludge are reduced. The activity of the sludge is correspondingly higher. After treatment in the activated sludge basin and a subsequent trickling filter the waste water described above had a five BOD of 12 to 15 mg./l. Furthermore, whereas the previous spraying of the surface of the areation chamber for suppression of foam had to be in operation uninterruptedly, it is now sufficient to operate the foam destruction according to the invention for 4 to 6 hours daily. This is sufficient to remove all foam formation favoring substances. Their thickening takes 18 to 20 hours.

While the description of the apparatus and the above example relate to a foam containing solids which can be readily settled in a thickener after the foam has been sufficiently diluted by spraying, the invention is also applicable when the foam does not contain solids, as occurs frequently in the chemical industry. In this case the thickener 2 is not required and, depending on its nature, solids free liquid resulting from the destruction of the foam, is withdrawn from the process to any suitable point of disposal or further treatment.

We claim:

1. In an apparatus for biologically treating waste liquids containing foam producing substances, said apparatus comprising an aeration chamber, means for introducing waste liquid to be aerated and air into said aeration chamber, and means for mixing and dispersing said air and liquid through the liquid contents of said aeration chamber in a manner to promote foaming of the foam producing substances, and means for withdrawing aerated waste liquid from said aeration chamber, means for collecting and destroying a foam layer formed by said substances above the liquid surface, comprising a foam colecting launder mounted in spaced relationship above the liquid surface in said aeration chamber and having an overflow edge subjacent the upper surface of said foam layer, means connected to a source of liquid and adapted to spray liquid into said launder to destroy said foam, and a conduit leading from said launder to a point of disposal.

2. Apparatus for biologically treating waste liquids containing foam producing stances, said apparatus comprising an aeration chamber, means for introducing waste liquid to be aerated and air into said aeration chamber and mixing them and dispersing the mixture through the contents of said chamber, and means for withdrawing treated waste liquid from said apparatus establishing a liquid level therein, characterized in that the lower portion of said aeration basin has a large cross-sectional area and the upper portion has a cross-sectional area which is only a small part of said large cross-sectional area, said air and waste liquid being introduced into said lower portion and said air rising to said upper portion, whereby a relatively small diameter high foam layer is built up above the liquid surface in said aeration chamber, foam collecting launder means spaced above said liquid surface and having overflow edges subjcent the upper surface of said foam layer, a plurality of nozzles connected to a source of liquid and positioned to spray liquid into said launder means to dilute and to destroy said foam, and a conduit leading from said launder means to a point of disposal.

3. In an apparatus for treating waste liquids containing foam producing substances, said apparatus comprising an aeration basin and a thickener, a partition in said aeration basin forming therein a central aeration chamber and a surrounding clarification chamber in hydraulic communication with each other at two elevations, the upper portion of said aeration chamber having a small cross-sectional area relative to the lower portion of said chamber, means for introducing waste liquid to be aerated and air into said lower portion and dispersing them through the contents of said lower portion, and means for withdrawing treated waste liquid from said aeration basin and establishing a liquid level in said basin, at least one foam collecting launder in said upper portion spaced above said liquid level, spray nozzles positioned to spray liquid into said launder, a conduit connecting said nozzles to a source of liquid, a conduit leading from said launder to said thickener, a solids outlet conduit leading from the lower portion of said thickener, and a clarified liquid outlet conduit leading from an upper portion of said thickener.

4. The apparatus of claim 3, wherein said clarified liquid outlet conduit is connected to said means for introducing waste liquid to be aerated into said lower portion.

5. The apparatus of claim 3, comprising also a conduit leading from the lower portion of said clarification chamber and discharging to said thickener.

6. In a process for biologically treating waste waters containing substances producing a relatively deep layer of foam on the liquid surface by aeration in an aeration zone, the improvement comprising aerating and mixing said waste water in a manner so as to promote formation of said foam layer, collecting foam from said layer in a confined foam collection zone above the liquid surface in said aeration zone but subjacent the surface of said foam layer, destroying the foam by spraying it in said collection zone with liquid, and withdrawing the liquid product of the foam and sprayed liquid from the aeration process to a point of disposal.

7. In a process for biologically treating by aeration in an aeration zone waste waters containing substances producing on the liquid surface a relatively deep layer of foam with a considerable solids content, the improvement comprising aerating and mixing said waters in the aeration zone in such a manner to promote formation of a foam layer, establishing a foam collection zone in said aeration zone subjacent the surface of the foam layer formed by said substances but above the liquid surface in said aeration zone, collecting and confining said foam in said collection zone, destroying said foam in said collection zone by spraying it with water, withdrawing the solids containing liquid formed by said foam and spray liquid from said collection zone to a liquid solids separation zone, withdrawing solids from one part of said separation zone and withdrawing substantially clarified liquid from another part of said separation zone.

8. The process of claim 7, wherein the substantially clarified liquid is returned to said aeration treatment.

9. A process for biologically treating by aeration in an aeration zone waste waters containing substances producing a relatively deep layer of foam on the liquid surface in said aeration zone, comprising introducing air and waste water to be aerated into said aeration zone and dispersing them over a large cross-sectional area in the lower portion of said zone, compressing the rising air below the liquid surface in an upper portion of said aeration zone having a much smaller cross-sectional area than said lower portion, to promote formation of a high layer of foam limited to a relatively small area, collecting and confining said foam in a confined foam collection zone subjacent the surface of said foam layer but above the liquid surface in said aeration zone, destroying the foam by spraying it in said collection zone with liquid, and withdrawing the liquid product of the foam and sprayed liquid from said foam collection zone to a point of disposal.

References Cited by the Examiner

UNITED STATES PATENTS

| | | | |
|---|---|---|---|
| 1,799,444 | 4/1931 | Sperr | 210—44 X |
| 2,186,371 | 1/1940 | Durdin | 210—44 |
| 2,440,514 | 4/1948 | Karlstrom | 210—44 |
| 2,800,459 | 7/1957 | Dijksman et al. | 252—361 X |
| 2,920,763 | 1/1960 | Lind et al. | 210—221 |
| 2,948,677 | 8/1960 | Austin et al. | 210—44 |
| 3,015,396 | 1/1962 | Quast | 210—221 |

OTHER REFERENCES

Infilco: The Aero-Accelator, a publication of Infilco Inc., Tuscon, Ariz., Bulletin 6510-D, 1957, 15 pp.

Gurnham: Principles of Industrial Waste Treatment, 1955, John Wiley & Sons, Inc., New York, pp. 72–73 relied on.

McKinney: Syndets and Waste Disposal, Sewage and Industrial Wastes, vol. 29, June 1957, pp. 654–666, pp. 658–659.

MORRIS O. WOLK, *Primary Examiner.*

CARL F. KRAFFT, *Examiner.*